United States Patent [19]

Tucker

[11] Patent Number: 4,889,302
[45] Date of Patent: Dec. 26, 1989

[54] DRINKING CONTAINER HOLDER

[76] Inventor: Dalton R. Tucker, 18218 Paradise Valley Rd. Space 91, Valley Center, Calif. 92082

[21] Appl. No.: 308,472

[22] Filed: Feb. 10, 1989

[51] Int. Cl.⁴ .............................................. F25D 3/08
[52] U.S. Cl. ................................... 248/146; 248/310; 248/910; 62/457.4; 220/85 H; 220/412; 215/12.2
[58] Field of Search ............... 248/128, 146, 148, 149, 248/176, 309.1, 310, 311.2, 314, DIG. 10, 1 R, 346, 364; 62/457.1, 457.3, 457.4, 457.7; 215/12.1, 12.2, 13.1; 220/85 H, 410, 411, 412

[56] References Cited

U.S. PATENT DOCUMENTS

| | | | |
|---|---|---|---|
| Re. 26,724 | 11/1969 | Paquin | 62/457.3 |
| 2,685,318 | 8/1954 | Merkle | 220/903 |
| 2,926,508 | 3/1960 | Moon | 62/457.3 |
| 3,028,702 | 4/1962 | St. Cyr | 248/310 |
| 3,161,031 | 12/1964 | Flannery | 62/457.4 |
| 3,269,144 | 8/1966 | Poris | 62/457.3 |
| 3,603,106 | 9/1971 | Ryan | 62/457.4 |
| 3,766,975 | 10/1973 | Todd | 62/457.3 |
| 4,163,374 | 8/1979 | Moore | 220/412 |
| 4,299,100 | 11/1981 | Crisman | 62/457.4 |
| 4,782,670 | 11/1988 | Long | 62/457.4 |
| 4,815,999 | 3/1989 | Ayon | 215/13.1 |

*Primary Examiner*—Robert W. Gibson, Jr.
*Assistant Examiner*—Robert A. Olson
*Attorney, Agent, or Firm*—John J. Murphey

[57] ABSTRACT

A beverage container holder for supporting a drinking container on a wide variety of surfaces and for keeping the beverage hot or cold, as desired, comprising a container holder, a liquid-impervious bladder secured around and beneath it and containing a small amount of cellulose fibers and a bacteriostat that swell in the presence of water to fill the bladder and be amenable to heating in a microwave oven or freezing to adjust the temperature of the swollen material.

34 Claims, 2 Drawing Sheets

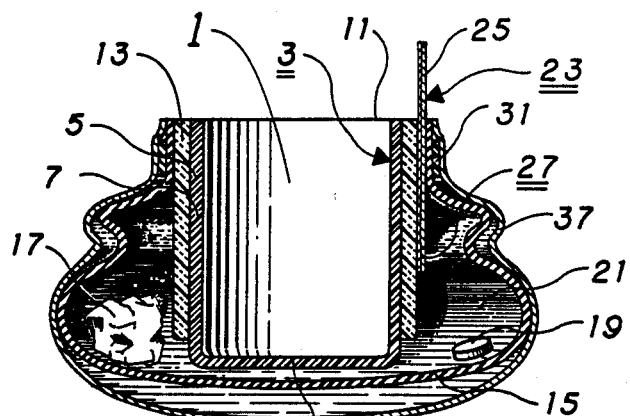
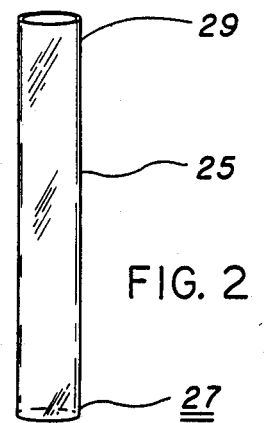
FIG. 1    FIG. 2
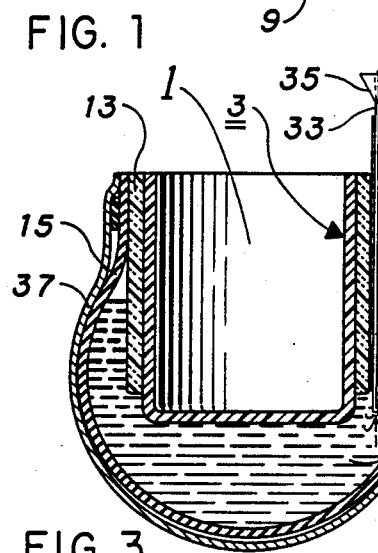
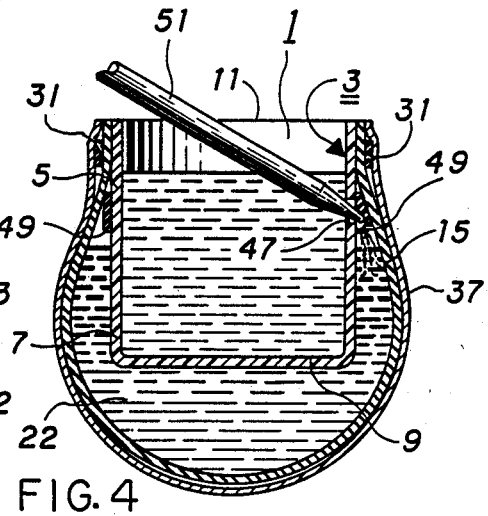
FIG. 3    FIG. 4
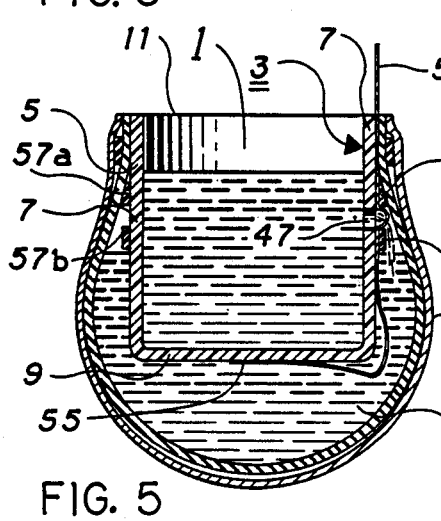
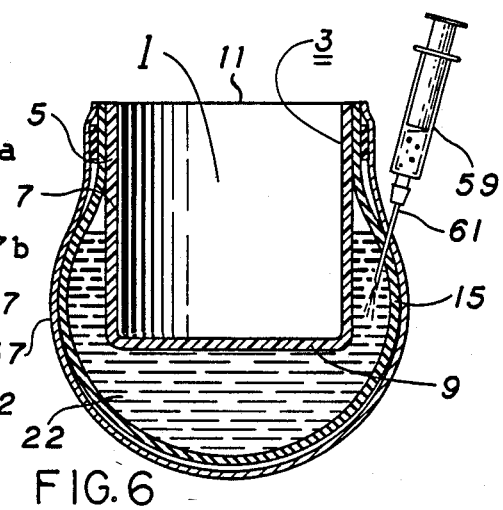
FIG. 5    FIG. 6

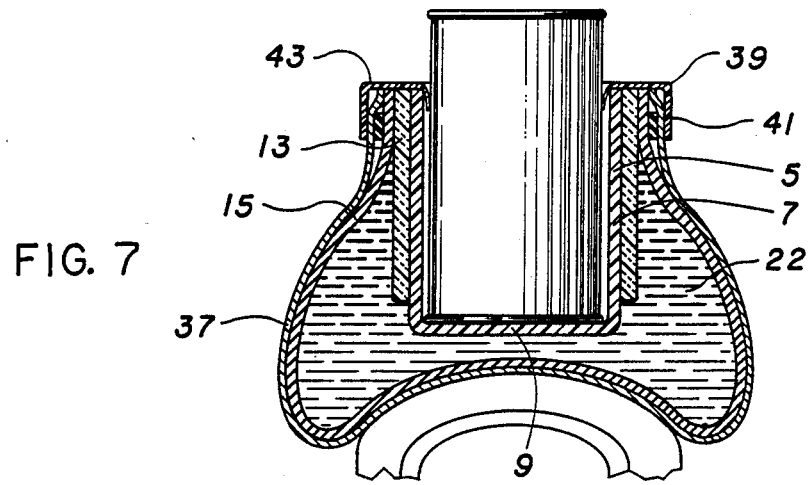
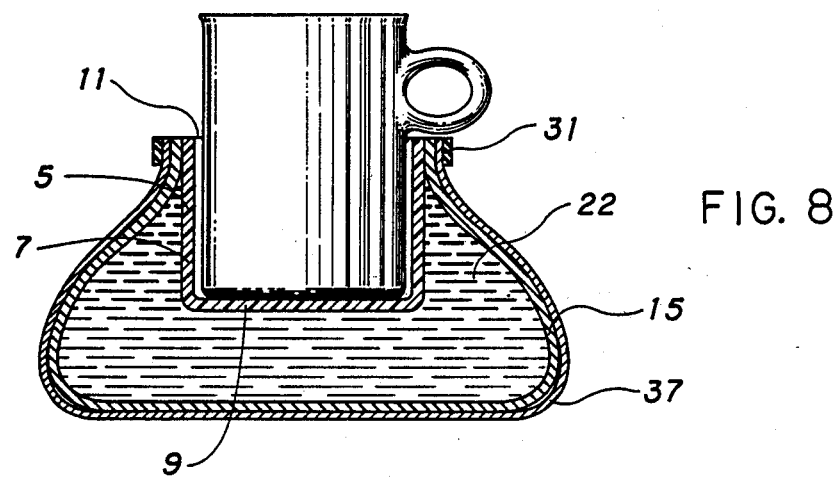
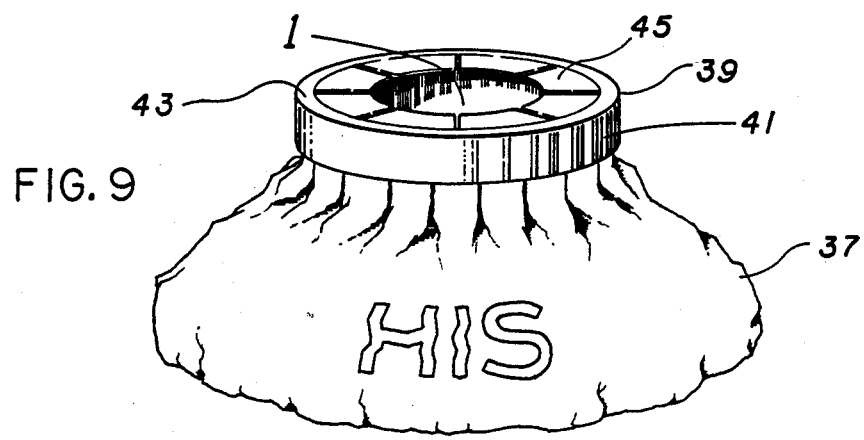

DRINKING CONTAINER HOLDER

BACKGROUND OF THE INVENTION

1. Field of the Invention

This invention pertains to the field of houseware utensils and more particularly to a beverage container holder that is adaptable for supporting a container of liquid on a variety of surfaces and maintaining the beverage in a cold state or a hot state, depending upon the desires of the user, as well as a process for manufacturing it that reduces overall costs and makes shipment cheaper and more efficient.

2. Description of the Prior Art

Beverage container holders are not new. U.S. Pat. No. 4,163,374 describes a beverage container holder that is insulated and contains a refrigerant for use in maintaining soft drinks or other beverages in a chilled state. Non-tipping beverage container holders also are not new. U.S. Pat. No. 3,028,702 discloses a support for a cup-like container such as a drinking glass having a pouch depending therefrom containing weighted pellets for stabilizing the drinking container when placed on a bumpy or odd-angled surface.

Neither of these prior art devices, however, has the ability to maintain a beverage in a cold state or alternatively in a hot state and support the container on a bumpy or odd-angled surface. There are those who would rather drink a hot beverage, such as coffee, than a cold beverage, such as beer, and the prior art has not seen fit to provide these persons with a holder that could be used in both instances.

Even more of a problem, however, is the fact that drinking container holders, such as the one shown in U.S. Pat. No. 3,028,702, have cost disadvantages as well. Specifically, the weight of the pellets in the holder means that shipping them from the manufacturing plant to the ultimate consumer involves the shipping of dead weight which raises the shipping price and thus the total cost of the device. Further, in packaging such devices, they cannot be stacked close together as the pouch extends beyond the edges of the holder receptacle and thus few of them may be packed in a carton for shipment because of this large size. Further, the holders cannot be stacked too high in the shipping carton or the cartons too high upon each other without the weight of the pelletized material becoming a factor that may cause crushing of the shipping carton or the beverage container holder around which the pouch is attached. All of these disadvantages, therefore, make these sort of non-tipping drinking container holders highly expensive as well as utilizable for only the beverages that are desired to stay cool during consumption.

SUMMARY OF THE INVENTION

This invention is a unique drinking container holder that overcomes all of the aforesaid problems of the prior art. It comprises a rigid drinking container holder, a loose bladder that envelopes the container and hangs below it and a sack that is placed over the bladder. Between the bladder and the container is a chamber in which is placed a small amount of fibrous material of the type that will swell in the presence of water or other liquid to form a thick, mushy substance as well as a small quantity of a bacteriostat to prevent unwanted fermentation. As manufactured and shipped to the distributor, the device is totally dry and the holders may be placed side-by-side in a container in far closer proximity than the already-filled pouch of the prior art. Because there is little or no weight in the small quantity of fibrous material and bacteriostat, the containers may be stacked far higher in a carton and more cartons placed on top of one another than with the weighted holders shown in the prior art.

At the destination, i.e., either at the retailer's store or in the purchaser's home, water or other liquid is poured into the chamber to cause the fibrous material to swell and form a thick, mushy weighted substance that will thereafter conform the bladder and sack to any surface on which the drinking container holder is placed. The liquid-filled chamber is thereafter hermetically sealed. As the liquid is only added at the destination, that weight is not involved in transportation thereby lowering the overall cost of the device.

The drinking container holder of this invention containing the liquid has numerous advantageous over those in the prior art. For instance, the holder may be placed in a refrigerator or freezer to cool or freeze the thick, mushy substance to thereafter chill drinks or retain cool drinks in a chilled state that are placed in the holder. The frozen material in the chamber removes heat from the beverage that enters through the exposed surface of the liquid to promote further cooling of the beverage. Alternatively, the holder may be placed in a microwave oven and subjected to microwave energy to heat the thick, mushy substance in the chamber. The hot substance thereafter heats a drink or retains a hot drink in a heated state in the holder. The hot, thick, mushy substance in the chamber provides additional heat to the cup or other hot beverage container to make up for heat lost from the exposed surface of the beverage.

Further, should, by some chance, the chamber be penetrated or the bladder cracked, loss of liquid is almost immediately stopped because the fibrous material will begin to exude through the crack or cut in the chamber wall and form a protective sealing mat or plug therein that acts to prevent further loss of liquid and fibers from the chamber.

Accordingly, the main object of this invention is a process of making a drinking container holder that reduces the cost of transporting them and makes boxing and crating them more efficient than processes found in the prior art. Other objects include a holder that is capable of being transported without the attendant dead weight as occasioned in other prior art devices of this type, a device that will render a drinking container non-tippable when placed on an uneven surface, a holder that may alternately be used to retain a cool beverage in a cool state or a hot beverage in a warm state, and a device that is self-sealing to prevent accidental leakage of the contents of the chamber without loss of utility of the device. These and other objects of the invention may be obtained by reading the Description of the Preferred Embodiment in light of the drawings attached hereto. The scope of invention sought by the inventor may be obtained from a fair reading of the claims that conclude this specification.

DESCRIPTION OF THE DRAWINGS

FIG. 1 is a sectional side view of one embodiment of the holder of this invention in its as-manufactured and ready-to-ship configuration;

FIG. 2 is an enlarged side elevational view of the sleeve used in FIG. 1 to add liquid to the chamber;

FIG. 3 is a sectional side elevational view of the embodiment shown in FIG. 1 showing the step of adding water through the sleeve into the chamber to transform the holder into its ready-to-use configuration;

FIG. 4 is a side elevational view of the embodiment shown in FIG. 1 showing another means of introducing a liquid into the chamber;

FIG. 5 is a side elevational view of the embodiment shown in FIG. 1 showing another means of introducing a liquid into the chamber;

FIG. 6 is a side elevational view of the embodiment shown in FIG. 1 showing yet another means of introducing a liquid into the chamber;

FIG. 7 is a sectional side view of the embodiment shown in FIG. 3 in its ready-to-use state containing a beverage container to be cooled or h and sitting on a non-flat surface;

FIG. 8 is a sectional side elevational view of another embodiment of the invention showing its use in supporting a cup of hot beverage.

FIG. 9 is a perspective view of the preferred embodiment of this invention in its ready-to-use state showing the outer surface of the sack containing printed advertising for use by merchants;

DESCRIPTION OF THE PREFERRED EMBODIMENT

FIG. 1 shows the preferred embodiment of the unique drinking container holder 1 of this invention in its ready-to-ship configuration. Holder 1 comprises means 3 for supporting a drinking container, such as a can or cup or glass, and includes a rigid, open-top receptacle 5 enclosed by a side wall 7, preferably cylindrical, and enclosed with a generally flat bottom wall 9 and terminated at the top by a rim 11. Receptacle 5 may be of a wide variety of diameters and depths and made from a variety of materials including plastics such as polyvinylchloride, polyethylene and plastic-rubber blends or be made of a metal such as steel or aluminum. A thin layer 13 of insulation may be provided on the outer side of receptacle side wall 7 preferably from rim 11 down to just above bottom wall 9. Insulation such as polystyrene foam or other plastic foams are contemplated for use in layer 13 and may be molded about receptacle 5 or cut and pasted thereto. The function of layer 13 is to add further insulation to side wall 7 to prevent the ingress and egress of heat energy to and from the beverage contained in the holder.

A liquid-impervious bladder 15, in the form of a flexible sack, is charged with a small quantity of fibrous material 17 and a small amount of a bacteriostat 19 and thereafter secured about receptacle 5 at or near rim 11 by glue or other suitable means, and adapted to extend loosely around and beneath receptacle 5 to form a sealed empty chamber 21 therebetween. Bladder 15 may be made from a wide variety of liquid-impervious materials including plastic films of polyvinylchloride, polyethylene, rubber, and blends of same. Fibrous material 17 may be made from any material that swells in the presence of a liquid, such as water, to form a thick, mushy substance 22; disintegrated paper such as newspaper is an example and is preferred. The charge depends upon the size of chamber 21 and should be enough to swell and fill said chamber. About 1 ounce is generally preferred. The bacteriostat is to prevent fermenting of the liquid-fiber mixture. An example of a bacteriostat is sodium hypochlorite. Bladder 15 is secured to receptacle 5 about insulation layer 13 however, where layer 13 is not used, bladder 15 is secured directly to receptacle side wall 7.

Means 23 is provided for adding liquid to fibrous material 17 to fill chamber 21. This step is normally performed at the distributor's location or at the purchaser's home. Means 23 may take a wide variety of forms and all are fully contemplated in this invention.

As shown in FIGS. 1, 2 and 3, means 23 includes a narrow, thin-walled and flattenable sleeve 25, preferably made from thin, flexible plastic, is inserted, during construction of holder between bladder 15 and either insulation layer 13 or cylindrical side wall 7 (if no insulation is used). Sleeve 25 is of terminal length and comprises a lower end 27, placed in communication with chamber 21, and an upper end 29 extending above rim 11. A narrow elastic band 31 is stretched over the upper end of bladder 15, near rim 11, and set over sleeve 25 to hold it in place. No glue is added to sleeve 25 as it will be removed before holder 1 is placed in service.

Continuing with means 23, a small-diameter hollow tube, such as a straw 33, is inserted into sleeve end 29 and pushed down, between receptacle side wall 7 and bladder 15 into chamber 21. Thereafter, water or other liquid may be added to chamber 21 to mix with fibrous material 17 and swell and fill said chamber. A small funnel 35 may be inserted in the end of tube 33 to aid in passing water into chamber 21. After filling chamber 21, tube 33 and sleeve 25 are both pulled up out of chamber 21 thereby allowing elastic band 31 to pull bladder 15 tightly against receptacle 5 to prevent leakage from chamber 21.

A flexible sack 37 is slipped over bladder 15 and secured to bladder 15 about rim 11 so that it also extends loosely around and beneath receptacle 5. Bladder 15 and sack 37 are preferably made the same size to prevent any chamber or air space from being developed therebetween. While there is no critical need to make sack 37 impervious to the passage of liquid, because bladder 15 will fully retain the soon-to-be added liquid in chamber 21, it may be made so and this will not detract from the invention. Further, bladder 15 may function alone without the need for sack 37. Sack 37 may be made from a wide variety of easily formable materials such as vinyl-coated fabrics and further may be fashioned to contain a printable outer surface as shown in FIG. 9 for placement thereon of a variety of symbols, trademarks, logos or other designs thereby rendering this invention usable as an advertising medium as well as a drinking container holder.

In its ready-to-ship (waterless) configuration, holder 1 may now be packed tightly side-by-side and stacked high in a carton and the cartons stacked higher upon each other and shipped for less cost than with the weighted holders of the prior art.

Preferably, a ring lip 39 is mounted over rim 11 to cover over the terminal edges of rim 11, insulation layer 13, bladder 15 and sack 37 and to present a smoother finish to the upper portion of holder 1 as well as to prevent objects from being pushed down through the joined materials into chamber 21 or in between bladder 15 and sack 37. Ring lip 39 comprises a collar 41 that extends a short way down over the outside upper edge of sack 37, an integral ring 43 surrounding the flat upper edges of rim 11 and a plurality of inwardly-directed pliable lips or flaps 45 that extend inward toward the interior of receptacle 5, each flap separated from its adjacent flap, to bend down upon the receipt into receptacle 5 of a can or cup or other beverage container as shown in FIG. 3.

Thick, mushy substance 22, comprised of fibrous material 17 swollen in the water or other liquid permits holder 1 to be placed in a freezer to freeze the substance, thereafter to chill the contents of the drinking container received therein, or alternatively, to be placed in a microwave oven to heat the substance, thereafter to heat the contents of a cup or other drinking container received therein. It has been determined, after many tests, that substance 22 releases heat and thaws very slowly so as to operate as a heating and/or cooling mechanism over an extended period of time—for instance during a long drive in an automobile. Should chamber 21 be penetrated by a sharp object or severe force or shock be applied to sack 37 and bladder 15, the swollen fibers will begin to exude from the crack or other cut and form a self-sealing mat at the site of the opening to thereafter contain the rest of the thick, mushy substance 22 in chamber 21.

FIG. 4 shows another example of means 23 for adding liquid to fibrous material 17 in chamber 21. In this example, a small aperture 47 is formed in receptacle side wall over which is positioned bladder 15 and an elastic band 49. After delivery to the distributor or user, water or other liquid is poured into receptacle 7 to a level above aperture 47. An instrument is provided with a sharpenable end such as a pencil 51. Its sharp point is pushed into the liquid and into aperture 47 to force bladder 15 and band 49 out of contact therewith. This allows the liquid to flow through aperture 47 into chamber 21. More liquid is added, as needed, until chamber 21 reaches the desired degree of fullness whereupon pencil 51 is withdrawn and receptacle 7 emptied. Band 49 will thereafter seal bladder 15 against aperture 47 to prevent leakage.

FIG. 5 shows still another example of means 23. Aperture 47 is again made in receptacle side wall 7. A flat strip 53 of a liquid-impervious material, such as polyvinylchloride, is fixed or glued at one end 55 to the outside of receptacle bottom wall 9. Strip 55 is passed up the outside of receptacle side wall 7, over aperture 47, and then out above rim 11. A pair of elastic bands 57a and 57b are stretched over receptacle 5 and strip 53 and set there about in spaced-apart relationship, one above and one below aperture 47. At the point where strip 53 passes over aperture 47, it is "puckered" or slightly pulled out from aperture 47. Later, liquid is poured into receptacle 5 to above aperture 47 whereupon it flows through aperture 47 into chamber 21. When the appropriate amount of liquid is passed into chamber 21, strip 53 is pulled firmly up from rim 11 thereby forcing it against aperture 47 to seal chamber 21 from leakage. Strip 53 is then cut back to rim 11.

FIG. 6 shows still another example of means 23 and shows a syringe 59 filled with liquid and fitted with a sharp, hollow needle 61. Needle 61 is inserted in a fold or seam in sack 37 so as not to leave an unsightly entrance hole. Needle 61 is then pushed through bladder 15 into chamber 21 where the liquid is deposited. Other forms of means 23 are available and usable herein and all of them are fully contemplated in this invention.

What is claimed is:

1. A shippable drinking container holder comprising:
   (a) means for supporting a drinking container including a rigid, open-topped receptacle terminated by an upper rim and having an enclosed bottom wall;
   (b) a liquid-impervious bladder secured about said receptacle and extending loosely therearound and beneath it to form a sealed chamber therebetween;
   (c) a mixture comprising a small amount of a bacteriostat and a small quantity of fibrous material, of the type that will swell in the presence of liquid to form a thick, mushy substance, in said chamber; and,
   (d) means for adding liquid to said fibrous material to fill said chamber.

2. The shippable drinking container holder of claim 1 further including a flexible sack surrounding said bladder and secured to said receptacle.

3. The shippable drinking container holder of claim 1 further including a plastic ring lip for placement about and over said rim of said receptacle and including a plurality of inwardly directed pliable flaps for contacting the drinking container, placed in said receptacle, and retaining it therein.

4. The shippable drinking container holder of claim 1 further including a layer of insulation surrounding all but the bottom of said receptacle.

5. The shippable drinking container holder of claim 1 further including a narrow elastic band fixed about said bladder and over said receptacle below said rim.

6. The shippable drinking container holder of claim 1 wherein said receptacle is cylindrical in shape.

7. The shippable drinking container holder of claim 1 wherein said fibrous material is comprised of cellulose fibers.

8. The shippable drinking container holder of claim 7 wherein said cellulose fibers are in the form of disintegrated paper.

9. The shippable drinking container holder of claim 2 wherein said flexible sack has a printable outer surface formed thereon.

10. The shippable drinking container holder of claim 1 wherein said means for adding liquid to said fibrous material to fill said chamber includes:
    (a) a flattenable, flexible sleeve temporarily fixed between said receptacle and said bladder, having one end extending above said rim and another end extending into said chamber; and,
    (b) a liquid transfer means insertable through said sleeve for passing liquid through said sleeve into said chamber.

11. The shippable drinking container holder of claim 10 wherein said liquid transfer means includes a small diameter, hollow tube through which the liquid may be passed into said chamber.

12. The shippable drinking container holder of claim 11 further including a funnel attached to the exterior of said tube.

13. The shippable drinking container holder of claim 1 wherein said means for adding liquid to said fibrous material to fill said chamber includes:
    (a) an aperture formed in said receptacle for access from inside said receptacle into said chamber;
    (b) an elastic band stretched over said bladder and said aperture to bias said bladder thereagainst; and,
    (c) an instrument having a tip, of a cross-section smaller than said aperture, for inserting into said receptacle to push said bladder and band away from said aperture to permit liquid to be passed therethrough into said chamber.

14. The shippable drinking container holder of claim 1 wherein said means for adding liquid to said fibrous material to fill said chamber includes:

(a) an aperture formed in said receptacle for access from inside said receptacle into said chamber;

(b) a strip of liquid-impervious sheet material anchored to the lower outside of said receptacle and drawn tightly up the side of said receptacle and out through said rim except for a short outwardly folded segment adjacent said aperture; and, (c) a pair of elastic bands stretched over said bladder, one above and one below said aperture to hold said short outwardly-folded segment of material apart from said receptacle so that after said receptacle is filled with liquid and it passes into said chamber, said strip may be pulled upward to close off said aperture.

15. The shippable drinking container holder of claim 1 wherein said means for adding liquid to said fibrous material to fill said chamber includes a syringe containing an elongated hollow needle for insertion through said bladder into said chamber to pass liquid thereinto.

16. A drinking container holder comprising:
(a) means for supporting a drinking container including a rigid, open-topped receptacle terminated by an upper rim and having an enclosed bottom wall;
(b) a water-impervious bladder secured about said receptacle and extending loosely therearound and beneath it to form a liquid-sealed chamber therebetween; and,
(c) an amount, sufficient to fill said chamber, of a mixture comprising:
 (1) a small amount of a bacteriostat;
 (2) a small quantity of fibrous material of the type that will swell in the presence of a liquid to form a thick, mushy substance; and,
 (3) sufficient liquid to form the thick, mushy substance.

17. The drinking container holder of claim 16 further including a flexible sack surrounding said bladder and secured to said receptacle.

18. A drinking container holder of claim 17 further including a plastic ring lip for placement about and over said rim of said receptacle and including a plurality of inwardly directed pliable flaps for contacting the drinking container, placed in said receptacle, and retaining it thereon.

19. The drinking container holder of claim 17 further including a layer of insulation surrounding all but the bottom of said receptacle.

20. The drinking container holder of claim 17 further including a narrow elastic band fixed about said bladder and over said receptacle below said rim.

21. The drinking container holder of claim 17 wherein said bladder is water-resistantly sealed to said receptacle except for the area wherein a sleeve passes therethrough.

22. The drinking container holder of claim 17 wherein said fibrous material is comprised of cellulose fibers.

23. The drinking container holder of claim 22 wherein said cellulose fibers are in the form f disintegrated paper.

24. The drinking container holder of claim 17 wherein said flexible sack has a printable outer surface thereon.

25. A process for manufacturing a shippable drinking container holder comprising:
(a) providing means for supporting a drinking container including a rigid, open-topped receptacle having an enclosed bottom wall and terminated by a rim;
(b) providing a water-impervious bladder and securing it about said receptacle such that it extends loosely therearound and beneath to form a chamber therebetween;
(c) placing in said chamber a mixture comprising a small amount of a bacteriostat and a small quantity of fibrous material of the type that will swell in the presence of a liquid to form a thick, mushy substance; and,
(d) providing a means for accessing said chamber from outside said holder to add liquid to said chamber.

26. The process of claim 25 including the additional step of providing layer of insulation about all but the bottom of said receptacle.

27. The process of claim 25 including the further step of providing an elastic band around said bladder.

28. The process of claim 25 wherein said fibrous material is comprised of cellulose fibers.

29. The process of claim 28 wherein said cellulose fibers are in the form of disintegrated paper.

30. The process of claim 25 including the further step of providing a flexible sack over said bladder and attaching it to said receptacle.

31. The process of claim 25 wherein said means for transmitting liquid into said chamber comprises providing a flattenable, flexible sleeve and placing it between said bladder and said receptacle with one end in said chamber and the other end extending above said receptacle.

32. The process of claim 31 including the further steps o withdrawing said sleeve from between said receptacle and said bladder to hermetically seal said substance in said chamber.

33. The process of claim 31 wherein said means for conveying water into said chamber includes inserting a long, narrow diameter tube through said sleeve into said chamber.

34. The process of claim 33 wherein said tube contains a funnel at its end exterior the chamber for receipt of water therethrough.

* * * * *